United States Patent Office 3,071,614
Patented Jan. 1, 1963

3,071,614
PURIFICATION OF AROMATIC ACIDS
James O. Knobloch, Hobart, Ind., assignor to Standard Oil Company, Chicago, Ill., a corporation of Indiana
No Drawing. Filed Oct. 25, 1957, Ser. No. 692,272
7 Claims. (Cl. 260—525)

This invention relates to aromatic carboxylic acids. More particularly it relates to the purification of aromatic hydrocarbon carboxylic acids ("aromatic acids") derived from the metal-catalyzed liquid phase oxidation of aliphatic-substituted aromatic compounds with molecular oxygen. Such aromatic acids are often contaminated with traces of a tar-like yellowish or tan-colored oxidation byproduct which creates a troublesome purification problem in the recovery of pure aromatic acids. These byproducts moreover inhibit crystallization when it is attempted to recrystallize aromatic acids from aqueous solutions to such an extent that a byproduct-contaminated solution containing five times the saturation concentration of aromatic acids remains stable for weeks despite shock-chilling and seeding.

An object of the present invention is to provide an improved process for purifying aromatic hydrocarbon carboxylic acids derived from the metal-catalyzed liquid phase molecular-oxygen oxidation of aliphatic-substituted aromatic compounds. A further object is to purify aqueous solutions of aromatic acids. Yet another object is to remove tar-like colored oxidation byproducts which inhibit crystallization of aromatic acids from aqueous solutions. An additional object is to provide an aromatic acid purification process in which the treating agent may be regenerated. Other objects will become more apparent as the description of this invention proceeds.

In accordance with the objects above, it has now been discovered that aqueous solutions of aromatic hydrocarbon carboxylic acids which are contaminated by colored byproducts of the metal-catalyzed liquid phase molecular-oxygen oxidation of aliphatic-substituted aromatic compounds may be purified by treating the solution with adsorbent alumina. A major portion of the byproducts are thus adsorbed on the alumina, and the aromatic acids may be recovered in a pure state from the treated solution by such convenient means as crystallization and/or evaporation. Alumina treating may if desired be conducted continuously, and may also be integrated with other aromatic acid separation and purification steps.

Liquid phase oxidations employing molecular oxygen and a metal oxidation catalyst have recently become extremely important in the commercial preparation of aromatic acids. In these processes an aliphatic hydrocarbon substituent on an aromatic ring is oxidized to a nuclearly-attached carboxylic acid group. The aliphatic substituent may be methyl, normal, secondary, tertiary or alicyclic and may be either saturated or unsaturated. An aromatic having more than one aliphatic substituent may require the conjoint presence of a metal oxidation catalyst and bromine as the catalyst to effect the production of high yields of aromatic polycarboxylic acids. Since polycarboxylic acids are more difficult to produce than monocarboxylic acids, by control over the reaction conditions it is possible to favor the oxidation of less than all of the aliphatic substituents in order to produce alkyl-substituted aromatic mono- or polycarboxylic acids. Thus the characterizations "aromatic hydrocarbon carboxylic acids" or "aromatic acids" as employed in the specification and in the claims relate to mononuclear and polynuclear aromatic compounds which have at least one nuclearly-attached carboxylic acid group and which may in addition have one or more hydrocarbon substituent such as an alkyl or alkenyl group.

Examples of aromatic hydrocarbon carboxylic acids, and of typical aliphatic substituted aromatic feedstocks which may be oxidized with molecular oxygen in the presence of a metal oxidation catalyst (preferably in the conjoint presence of an oxidation catalyst and bromine) to produce them, are:

TABLE I

| Group | Acid | Feedstocks |
| --- | --- | --- |
| Benzene Carboxylic | Benzoic | Toluene, ethylbenzene, stryene. |
| | o-Phthalic | o-Xylene, indene, o-toluic acid. |
| | Isophthalic | m-Cymene, m-xylene, m-diacetyl benzene. |
| | Terephthalic | p-Xylene, p-tolualdehyde, hydroxycumic acid. |
| | Trimellitic | Pseudocumene. |
| | Trimesic | Mesitylene. |
| | Mellophanic | Prehnitene. |
| | Mellitic | Hexamethylbenzene. |
| | Pyromellitic | Durene. |
| Alkyl-benzene Carboxylic | m-Toluic | m-Xylene. |
| | 3-Methyl-ortho-phthalic. | Hemimellitene. |
| | t-Butyl-o-phthalic. | t-Butyl-orthoxylene. |
| | p-Cumic | p-Cymene. |
| | m-Ethyl benzoic | m-Methylethyl benzene. |
| | Durylic | Durene. |
| Polynuclear Aromatic | Diphenic | Phenanthrene. |
| | Naphthalene 2,6-dicarboxylic. | 2,6-Dimethyl naphthalene. |
| | Naphthoic | Methyl naphthalenes. |
| | Naphthalic | Acenaphthene. |

Liquid phase molecular-oxygen oxidation processes are conducted according to known procedures at a temperature in the range of 60 to 275° C., and preferably 170–225° C. The pressure may be from atmospheric to about 100 atmosphere or more, and is desirably about 28 atmospheres. Air, air containing a diluting proportion of an inert gas, commercially pure oxygen and ozone are common sources of molecular oxygen. Oxidation catalysts are soluble forms of one or more metals, preferably salts of the known heavy metal oxidation catalysts such as cerium, cobalt, manganese, lead, chromium, nickel, molybdenum, and tungsten. The metal catalyst may be added to the reaction in elemental form, or as an ionic compound such as cobalt acetate or ammonium molybdate, or in combined form such as tetraethyllead or cobalt versene. Similarly bromine may be elemental, in an ionic compound such as HBr or ammonium bromide, or as tetrabromoethane or benzyl bromide. The oxidation reaction is advantageously conducted in the presence of an inert solvent for the feedstock and catalyst; the solvent preferably being a saturated monocarboxylic acid having from 2 to about 8 carbon atoms in the molecule such as acetic acid, but may be such diverse liquids as water, benzophenone, benzonitrile, octyl alcohol, mineral oil, or chlorinated hydrocarbons.

Aromatic acids are separated in crude form from a reaction mixture by any one or more of a variety of physical or chemical techniques. Insoluble aromatic acids such as isophthalic or terephthalic may be filtered, centrifuged, or decanted from the mixture at elevated temperatures, and even the more soluble acids such as benzoic and phthalic may be removed by these techniques from a cooled reaction mixture. Aromatic acids may also be obtained in very impure form by merely evaporating water and the solvent, or by extraction with selective solvents. Since it is often more convenient to resolve mixtures of isomeric aromatic acids than to separate isomers of the feedstock, quite commonly an isomeric mixture of aliphatic-substituted aromatic compounds is oxidized at one time, and a combination of one or more physical and/or chemical separation techniques employed to resolve the mixed aromatic acids in the reaction mixture.

In all of the foregoing separations—whether the aromatic acid is recovered as a filtered solid, a distillation or evaporation bottoms, or as an extract—the aromatic acids are contaminated by deep yellow or tan-colored oxidation byproducts. When concentrated, these byproducts have a tar-like consistency. They boil within a very wide range of temperature and hence cannot be removed by distillation. Extensive investigation has shown that tar-like byproducts from the oxidation of a single alkylbenzene may have phenolic, acidic, ester, carbonyl, and olefinic groups, and as a consequence are soluble to some extent in most common solvents for aromatic acids.

Attempts to remove these byproducts from aromatic acids by prior-art methods have failed to suggest a process suitable for commercial adaptation. For example, aromatic acids produced by the Willgerodt oxidation of an alkylbenzene with ammonium sulfide, ammonium sulfate, and water are decolorized by passing the reaction mixture thru activated charcoal, but when it was attempted to purify byproduct-contaminated ammonium phthalate solutions with charcoal or with alumina, it was found that the phthalic acid could not be recovered from the treated solution in an acceptable yield. Adsorbent alumina will not purify aqueous solutions of alkali metal salts or aromatic acids, and of course only the very volatile aromatic acids may be purified by distillation. Treating aqueous solutions of alkali metal salts of liquid-phase-catalytic aromatic acids with charcoal is extremely effective, but requires the use of stoichiometric amounts of alkalies to dissolve the aromatic acids and then equal quantities of mineral acids to "spring" the treated aromatic acids.

In contrast to the methods described above, the process of this invention, i.e., purifying aqueous aromatic acid solutions by treating with adsorbent alumina, is simple, flexible, highly effective, and very economical. It is also the only process which permits regeneration of the adsorbent. No extraneous reagents are necessary, except for a small amount of an alkali used for adsorbent regeneration, which affords appreciable cost savings and reduces sources of possible contamination. Moreover, the process may be integrated with aromatic acid separation processes such as water extraction of orthophthalic acid from orthophthalic-isophthalic-terephthalic mixtures, or the extraction of an isophthalic acid concentrate from isophthalic-terephthalic mixtures with hot water wherein the extract solutions may be purified by alumina treatment. Further, equipment corrosion is negligible in contrast to acid-springing techniques. Process control is simplified by the use of white adsorbent alumina crystals since adsorbent effectiveness and capacity may be monitored visually by observing the color of the alumina. And finally the product may be recovered merely by cooling the purified solution to crystallize the aromatic carboxylic acids, or by evaporating the water, or by a combination employing both.

Aluminas suitable for treating byproduct-contaminated aqueous aromatic acid solutions are preferably either of two types, the so-called "activated alumina" and "activated bauxite." Both are forms of aluminum oxide which have been heated to remove most of the bound water and to provide an adsorbent having a surface area between about 50 and 500 square meters per gram. "Activated alumina" is obtained by heating the product of the Bayer process for the preparation of alumina. The Bayer process involves extracting bauxite (aluminum ore) with hot caustic, cooling and diluting the extract with cold water to hydrolyze and precipitate the alumina, and calcining the precipitated alumina. "Activated bauxite" is merely heat-activated natural bauxite. Both products are stable crystalline materials which are supplied commercially in hard grains, lumps, balls, and tablets of various mesh sizes. Other heat or chemically activated alumina-containing materials which are insoluble in water may be employed with somewhat lesser effectiveness.

In the practice of the present invention, the initial step is obtaining an equeous solution of the aromatic acid or the mixture of aromatic acids. This may be done either by dissolving the acid in water, extracting a soluble acid from a less-soluble one with water, extracting a distillation bottoms with water, or inherently by conducting the oxidation in water or a water-containing inert solvent. The aqueous solvent used for dissolving the aromatic acid may be water alone or may be water with minor amounts of solubilizing agents such as the lower alcohols, e.g. methanol, or the lower saturated aliphatic acids as acetic, but these are not essential.

The necessary quantity and temperature of the dissolving water depends upon the solubility of the aromatic acid and also on whether a single aromatic acid or a mixture of acids is to be dissolved. As will be shown hereinafter, aromatic acids are more soluble in water containing other aromatic acids than in pure water. Since most aromatic acids are comparatively insoluble it is desirable to conduct the dissolving and alumina treating at an elevated temperature, i.e. from about 20 to 300° C. or higher, and preferably from 50 to 100° C. At temperature substantially above 100° C. pressure containing equipment is required. Table II below presents the solubility data at various temperatures for some of the more common aromatic acids, together with the vapor pressure (in pounds per square inch absolute) of pure water at the respective temperatures shown. In the table benzoic acid is designated BA, ortho-phthalic acid PA, phthalic anhydride PAN, isophthalic acid IA, terephthalic acid TA, and trimellitic acid TMLA.

TABLE II

| Temp., ° C. | Pressure, p.s.i.a. | Solubility in grams per 100 grams water | | | | | | | |
|---|---|---|---|---|---|---|---|---|---|
| | | BA | PA | PAN | IA | TA | IA + TA | | TMLA |
| | | | | | | | IA | TA | |
| 20 | 0.37 | 0.29 | 0.64 | 0.52 | 0.011 | 0.0014 | 0.011 | 0.0014 | 1.75 |
| 50 | 1.7 | 0.84 | 1.7 | 1.6 | 0.037 | 0.0046 | 0.037 | 0.0046 | |
| 100 | 14.7 | 7.9 | 19.0 | 16.5 | 0.28 | 0.034 | 0.32 | 0.035 | 44.5 |
| 150 | 69.0 | >100 | 200 | 147 | 2.1 | 0.25 | 3.3 | 0.31 | |
| 200 | 225.5 | | | | 16.0 | 1.90 | 51 | 4.4 | |
| 250 | 576.6 | | | | 120 | 14.3 | >100 | >100 | |
| 300 | 1,245.9 | | | | | 110 | | | |

After dissolving the aromatic acid (together with contaminating oxidation byproducts and any oxidation catalyst) in water, the resulting solution is advantageously filtered to remove insoluble polymers and any undissolved aromatic acid. This operation may be conducted in a conventional pressure filter as for example a Shriver plate-and-frame filter press employing canvas filter cloths.

The adsorbent alumina may be disposed either in one or more fixed "percolation process" beds or it may be slurried with the solution either batchwise, continuously, or intermittently in a "contact process." In a percolation operation the adsorbent preferably has a mesh size between about 5 and 90 U.S. standard screen size, and the solution is passed through the bed either upflow or downflow. Since adsorbent alumina is normally a glassy white solid, if the adsorption vessel is provided with portholes or other viewing means it is possible to visually monitor the saturation of the alumina by following the progression of color through the bed, and discontinuing the flow of solution when the bed becomes completely colored. Flow rates through the bed are regulated to give between about 5 minutes and 1 hour or more contact time, preferably a time in excess of 10 minutes. The necessary quantity of alumina depends on the amount of byproducts present and the degree of byproducts removal desired; it may range from $\frac{1}{100}$ to 10 parts by weight per part of dissolved acid, but is preferably from $\frac{1}{2}$ to 2 parts. The percolation temperature may range from the temperature used for dissolving the aromatic acid to as low as the saturation temperature; although, as will be shown by the examples hereinafter presented, percolation can be employed with supersaturated solutions, this procedure is undesirable in a percolation process as crystallization of aromatic acids from supersaturated solutions inevitably occurs in the bed. Percolation adsorption is very advantageously used when operating at pressures substantially in excess of atmospheric.

As an alternate to percolation, the contact process may be employed wherein fines (approximately 100–200 mesh) or larger particles of the adsorbent are held in suspension in a fluid stream from which they are separated by filtration after a sufficient time of contact. The contact process may be conducted either by slurrying fines or larger adsorbent particles with the solution in an open tank or in a pressure vessel or by injecting fines into a pipeline carrying the solution, which pipeline is of sufficient length to provide a suitably long contact time. Again the contact time is preferably within 5 minutes to 1 hour, optimally more than 10 minutes, and quantities of alumina similar to those in percolation are required. Separation of the adsorbent particles may be accomplished by filtration, centrifugation, or settling, or by the use of hydrocyclones. An interesting phenomenon observed in the contact process is that it may be employed with cold supersaturated solutions yet, because colored by-products removal is not quite complete, crystallization does not commerce instantaneously.

The treated solution may contain dissolved metal oxidation catalyst, traces of dissolved alumina, and/or bromides. These may be removed by passing the solution through a strong acid-acting cation exchange resin to remove the metal catalyst and alumina and by passing the solution through a weakly basic anion exchange resin to remove the bromide. With ion exchange resins (particularly of the anion type) temperatures substantially in excess of about 150° C. are undesirable because of some solubility of the resin in hot water.

The alumina treated and preferably deionized solution may then be treated for recovery of the aromatic acid. While a variety of chemical and physical separation means are available, two physical methods are outstanding with respect to economy and efficiency of operation. In the first, the solution is cooled in order to crystallize the aromatic acid therefrom, while in the second, a part or all of the water is evaporated to effect crystallization. Both methods may be employed simultaneously or concurrently; for example the solution may be cooled to crystallize aromatic acids which are then filtered off, and the mother liquor evaporated to recover additional aromatic acids. By concurrent use of crystallization and evaporation, the solution is flashed into a lower pressure region where part or all of the water is evaporated, leaving crystals or a crystal-containing concentrated slurry of cold water and aromatic acids. Flashing has the advantage of reducing equipment costs but is somewhat expensive in terms of heat requirements as none of the sensible heat content of the solution can be recovered by heat exchange, as may be accomplished when aromatic acids are recovered by cooling or evaporating the solution.

As a preferred embodiment of the aromatic acid recovery step, the purified solution is cooled by indirect heat exchange with the water used for initially dissolving the crude aromatic acid. The temperature of the cooled purified solution may be any temperature at which the aromatic acid has a solubility less than its saturation concentration in the aqueous solvent. Cooling may be quite rapid in which event the aromatic acid crystallizes in the form of tiny crystals, or may be gradual, e.g. over several hours, to "grow" the aromatic acid crystals. The cooling rate and/or temperature may be regulated if it is desired to separate more than one dissolved aromatic acid by selective crystallization. Since crystallization from a treated solution may commence almost immediately upon reaching the saturation temperature, it is desirable to effect cooling and crystallization in a scraped-surface jacketed tank or scraped-wall tube-type heat exchanger to prevent crystal accumulation on the vessel walls. Filtration, centrifugation, decantation, or hydrocyclones may be used to separate the aromatic acid crystals from the mother liquor. The mother liquor may be evaporated entirely or in part to recover additional aromatic acids or, and preferably, is recycled to the aromatic acid dissolving step.

The recovered aromatic acid crystals are pure white or only slightly tinged with yellow and may be air dried or dried under vacuum to obtain pure aromatic acids of commerce.

The adsorbent alumina employed for purifying the aqueous aromatic acid solution may be regenerated and reused by washing with a solvent for the colored oxidation byproducts. Preferably the solvent comprises an aqueous solution of an alkali metal hydroxide or other base compound such as a carbonate. A caustic solution containing from about 1 to 10% sodium potassium or lithium hydroxide is very effective for this purpose. After regeneration, the adsorbent bed is washed with demineralized water to obviate the possibility of contaminating the aromatic acids with the hydroxide. The regenerated bed is washed with water to a neutral pH prior to returning the bed on stream. Organic solvents such as methanol, pyridine, chloroform, benzene, or hexane are not effective for desorbing colored byproducts.

Various embodiments of the present invention are further illustrated by the examples below.

*Example I*

Adsorbent alumina was employed in a contact process to purify a byproduct-contaminated supersaturated ortho-phthalic acid solution. The solution was obtained by heating 70 g. of o-phthalic acid that was contaminated by colored oxidation byproducts of the bromine-promoted metal-catalyzed air oxidation of orthoxylene in an acetic acid medium in 1 liter of water to boiling, cooling to 25° C. and filtering off solids.

By titration with a standard base, the solution, having a deep yellow color, was found to contain 3.69 grams of ortho-phthalic acid per 100 ml. of solution at 25° C. Since saturation at this temperature is a concentration of only 0.74 gram per 100 ml., the solution had 400% more aromatic acid than at saturation, yet was quite stable. Evaporating an aliquot portion confirmed the ortho-phthalic acid concentration. The solids obtained on evaporation had an acid number of 667; the theoretical acid number of phthalic acid is 675.

A 100 ml. sample of the original solution was added to a beaker containing 1.4 grams of adsorbent alumina manufactured by the Fischer Scientific Company and designated grade A–541/2, 80–200 mesh. The suspension was stirred for 20 minutes at room temperature and then filtered through a tared M-porosity fritted glass crucible. The recovered alumina weighed 1.497 grams after air drying and was light yellow in color.

The filtrate was almost colorless. Standing overnight at room temperature caused phthalic acid to precipitate. The solid material was filtered off and found to weigh 2.566 grams after air drying. This represents a 69% recovery of phthalic acid. The solids had an acid number of 673 (theoretical is 675) and contained only a trace of the original yellow color. The filtrate was evaporated to dryness and 0.965 gram (26% of the original ortho-phthalic acid) of very white ortho-phthalic acid was recovered.

Thus a 96% recovery of white almost pure ortho-phthalic acid was obtained.

*Example II*

An alumina percolation operation at room temperature was employed to purify the supersaturated solution of Example I.

The bed was prepared by slurrying 25 grams of Fischer A–541/2 alumina with 98 cc. of water saturated with reagent grade ortho-phthalic acid at 25° C., and the suspension poured into a glass column to form a bed 13¾ inches high by ⅜ inch I.D. which was full of liquid. To this column was added 100 ml. of the deep-yellow-colored byproduct - contaminated supersaturated ortho - phthalic solution of Example I. With nitrogen pressure (4 p.s.i.g.) this yellow solution was eluted down through the column in 10 minutes, leaving a color band at the very top of the column. An additional 100 ml. of the same contaminated solution was added to the column. After 17 hours under the same nitrogen pressure only 88 grams of solution had been eluted from the second 10 ml. charge. This indicated that the supersaturated solution was depositing solid ortho-phthalic acid within the column which was plugging the adsorbent bed.

The eluted solutions were water white and were evaporated to recover 3.22 grams of perfectly white ortho-phthalic acid crystals. A total of 7.82 grams of ortho-phthalic acid had been added to the column.

*Example III*

A deep yellow supersaturated aqueous ortho-phthalic acid solution was alumina treated in a contact operation at 70° C.

The original solution was prepared as in Example I and found by titration to contain 3.64 grams of ortho-phthalic acid per 100 ml. of solution, representing supersaturation at room temperature to the extent of about 2.94 grams per 100 ml. solution. It was very deep yellow in color.

A 100 ml. sample of this solution was slurried with 1.3560 grams of Fischer A–541/2 adsorbent alumina. The suspension was heated in a beaker to 70° C. and held between 70 and 80° C. for 10 minutes with stirring. The alumina was filtered off at 70° C. and was tan in color. On cooling the filtrate to 40° C., crystallization commenced. The solution was permitted to remain at room temperature for about 15 hours and produced coarse crystalline ortho-phthalic acid having a lemon-yellow color. 2.213 grams (61%) of ortho-phthalic acid was recovered by filtration, and an additional 1.24 grams (34%) by evaporation of the water-white filtrate.

*Example IV*

A deep yellow solution of ortho-phthalic acid (derived from the air oxidation of orthoxylene in acetic acid in the presence of a cobalt bromide catalyst) was treated by percolation through an adsorbent alumina bed at 94° C.

The adsorbent bed was prepared by slurrying a mixture of 25.0 grams of Fischer A–541/2 adsorbent alumina in 92 cc. of room-temperature-saturated aqueous ortho-phthalic acid (reagent grade) solution into a jacketed glass tube. The jacketed column was 24 inches long by ⅜ inch I.D. and was plugged at the bottom with a wad of glass wool. The alumina filled the column to a depth of 15 inches above the supporting glass wool. The column was heated to 94° C. by circulating oil from a constant temperature bath through the jacket. A total of 400 cc. of a deep yellow aqueous solution of ortho-phthalic acid containing 6.10 grams of acid per 100 ml. (24.40 grams ortho-phthalic acid in all) was eluted through the column in 50–55 minutes at 94° C. with 2 p.s.i.g. nitrogen pressure. At this temperature, the solution was not saturated with respect to phthalic acid.

After the yellow solution had been eluted through the column, the color band extended about 1½ inches down from the top of the column, suggesting an ultimate effective adsorbent life of 160 cc. of solution per gram of alumina. The solution left the column having only a trace of a very light green color. On cooling to 20° C., 10.143 grams (41.5%) of ortho-phthalic acid having a faint trace of yellow color was deposited. The cooled solution was filtered to separate the solid ortho-phthalic acid, and the water-white filtrate evaporated to yield an additional 9.69 grams (37%) quantity of ortho-phthalic acid that showed no trace of any color.

The adsorbent bed was washed with three 100 ml. portions of water at 94° C. The wash water had only a trace of a very light green color. The color band on the alumina appeared unaffected by the hot wash water. The wash water eluted 3.05 grams (12.5%) of ortho-phthalic acid.

Thus a total of 22.88 grams of almost colorless ortho-phthalic acid was recovered. This represents 94% of the ortho-phthalic acid charged.

*Example V*

A byproduct-contaminated aqueous trimellitic acid solution was alumina treated in a percolation operation at 26° C. The solution was unsaturated with respect to trimellitic acid at the treating temperature.

The trimellitic acid was prepared by oxidizing pseudocumene with air in an acetic acid solvent and in the presence of a cobalt-manganese-bromine catalyst. The trimellitic acid was filtered from the oxidation reaction mixture and given an initial purification by recrystallization from water. Sixteen grams of the recrystallized acid (acid number 798; theoretical acid number is 801) having a APHA color in excess of 500 (solution color in dimethylformamide) was dissolved in one liter of water at 26° C.

Fischer alumina (A–541/2, 80–200 mesh, 25.0 grams) was prepared by slurrying 25.0 grams of the alumina with 5 successive portions of 100 ml. of water, allowing the coarser material to settle, and decanting the suspension of fines. The coarse alumina particles were then slurried with 250 ml. of water and poured into a 25 inch high by ⅜ inch diameter glass tube which had a glass wool plug sealing the bottom thereof.

All of the byproduct-contaminated trimellitic acid solution was eluted downward from the bed over a 1½ hour period. No attempt was made to wash the bed free of occluded solution.

After elutriation, a color band extended about 4 inches down from the top of the column and was most intense in the first ½ inch, thereafter tapering in intensity.

The eluted solution was filtered from a small amount of suspended alumina and was evaporated under vacuum at 45° C.

The trimellitic acid recovered by vacuum evaporation weighed 12.9 grams and represented 80.7% of the trimellitic acid charged. It had an APHA color of approximately 15.

From the discussion and examples above, it is seen that adsorbent alumina is extremely effective for removing colored tar-like byproducts from aqueous aromatic acid solutions. By either percolating or slurrying the solution with alumina it is possible to adsorb practically all of the tar-like materials from solution and permit recovery of high purity aromatic acids. The process of the invention furthermore allows the use of relatively low cost adsorbents and also permits of their regeneration merely by washing with a basic solution.

Having described the invention, I claim:

1. In a process for purifying an aromatic hydrocarbon carboxylic acid which is contaminated with traces of tar-like byproducts of the heavy-metal-catalyzed liquid-phase molecular-oxygen oxidation of an aliphatic substituted aromatic compound, the improvement of contacting an aqueous solution containing aromatic hydrocarbon carboxylic acid and said byproducts with adsorbent alumina, whereby said byproducts are selectively adsorbed onto the alumina.

2. Process of claim 1 wherein said aromatic hydrocarbon carboxylic acid is a benzene polycarboxylic acid.

3. Process of claim 2 wherein said benzene polycarboxylic acid is ortho-phthalic acid.

4. Process of claim 2 wherein said benzene polycarboxylic acid is trimellitic acid.

5. Process of claim 1 wherein aromatic hydrocarbon carboxylic acid is recovered from said aqueous solution subsequent to said contacting step by cooling said solution and crystallizing aromatic hydrocarbon carboxylic acid therefrom.

6. Process of claim 1 wherein the temperature of said contacting step is from about 20 to 300° C.

7. Process of claim 6 wherein the temperature of said contacting step is from 50–100° C.

References Cited in the file of this patent

UNITED STATES PATENTS

| | | |
|---|---|---|
| 2,154,626 | Koch | Apr. 18, 1939 |
| 2,726,262 | Grosskinsky et al. | Dec. 6, 1955 |
| 2,744,938 | Urban | May 8, 1956 |
| 2,862,958 | Goreau | Dec. 2, 1958 |

OTHER REFERENCES

Weissberger, Technique of Organic Chemistry, vol. V, Adsorption and Chromatograph, pages 189–90 and 206 (1951). (Copy in Library.)

National Bureau of Standards, Bibliography of Solid Adsorbents, 1943 to 1953, article Nos. 3232, 919, 4498, 4611, 4667, 8977, 9038, 9081, 7920, 12747, 4835, 2689 and 3785. (Circular 566.) (Copy in Division 31.)